US008751803B2

(12) United States Patent
Lee et al.

(10) Patent No.: US 8,751,803 B2
(45) Date of Patent: Jun. 10, 2014

(54) AUTO PROVISIONING METHOD IN WIRELESS COMMUNICATION NETWORK

(75) Inventors: Hsueh Chen Lee, Hsinchu County (TW); Cheng Tsung Tai, Hsinchu County (TW)

(73) Assignee: Ralink Technology Corporation, Hsinchu County (TW)

( * ) Notice: Subject to any disclaimer, the term of this patent is extended or adjusted under 35 U.S.C. 154(b) by 325 days.

(21) Appl. No.: 12/842,437

(22) Filed: Jul. 23, 2010

(65) Prior Publication Data

US 2011/0296178 A1 Dec. 1, 2011

Related U.S. Application Data

(60) Provisional application No. 61/347,830, filed on May 25, 2010.

(51) Int. Cl.
*H04L 9/32* (2006.01)

(52) U.S. Cl.
USPC .......................................... 713/168; 380/227

(58) Field of Classification Search
USPC ...................... 726/2–3, 14, 16; 713/169, 168; 380/277; 709/227
See application file for complete search history.

(56) References Cited

U.S. PATENT DOCUMENTS

| 7,787,863 B2* | 8/2010 | van de Groenendaal ..... 455/411 |
| 2005/0055568 A1* | 3/2005 | Agrawala et al. ............. 713/200 |
| 2005/0260996 A1 | 11/2005 | Groenendaal |
| 2006/0171384 A1* | 8/2006 | Graves .......................... 370/389 |
| 2007/0177627 A1* | 8/2007 | Raju et al. ...................... 370/469 |
| 2008/0267407 A1* | 10/2008 | Vanderveen .................. 380/277 |
| 2010/0054154 A1* | 3/2010 | Lambert et al. ............... 370/254 |
| 2010/0166186 A1* | 7/2010 | Shiba ............................. 380/278 |
| 2012/0078735 A1* | 3/2012 | Bauer et al. ..................... 705/16 |

OTHER PUBLICATIONS

Dino A.; Attacking Automatic Wireless Network Selection; Mar. 18, 2005; IEEE; pp. 1-10.*
Office Action issued by Taiwan Intellectual Property Office on Jul. 29, 2013 for TW application No. 100111481.
English Translation Summary of Office Action issued by Taiwan Intellectual Property Office on Jul. 29, 2013 for TW application No. 100111481.

* cited by examiner

*Primary Examiner* — Mohammad W Reza
*Assistant Examiner* — Monjour Rahim
(74) *Attorney, Agent, or Firm* — WPAT, P.C.; Anthony King; Kay Yang

(57) ABSTRACT

A method for auto provisioning for a communication device in a wireless communication network comprises the steps of: receiving a request from a station; determining the validity of the request according to a verification code carried by the request; sending a response to the station; receiving a security message from the station; retrieving a security key carried by the security message; and executing network provisioning according to the security key.

21 Claims, 8 Drawing Sheets

AUTO PROVISIONING METHOD IN WIRELESS COMMUNICATION NETWORK

CROSS-REFERENCE TO RELATED APPLICATIONS

This application is an application under 35 USC 111(a) and claims priority under 35 USC 119 from Provisional Application Ser. No. 61/347,830 filed May 25, 2010 under 35 USC 111(b), the disclosure of which is incorporated herein by reference.

BACKGROUND OF THE INVENTION

1. Field of the Invention

The present invention relates to a wireless communication network, and more particularly, to an auto provisioning method in a wireless communication network.

2. Description of the Related Art

In recent years, Internet has become the main infrastructure for information exchange. Since Internet allows free flow of information, security issues have become a major concern. In a Wi-Fi wireless communication system, security setup is one step, known as Wi-Fi protected setup (WPS), of the network provisioning procedure.

WPS is a standard created by the Wi-Fi Alliance for easy and secure establishment of a wireless communication network. The WPS protocol aims to simplify the process of configuring security on wireless communication networks, and therefore is meant to allow users with little knowledge of wireless security and those who may be intimidated by the available security options to configure the required procedure smoothly.

However, even though the WPS standard has existed for years as the Wi-Fi network provisioning procedure, users still require some experience and setup knowledge to correctly configure the network provisioning procedure. That is, users are required to manually search and enter some information, for example, the PIN code of a station, required by the network provisioning procedure, which is not user friendly.

Therefore, there is a need to design a provisioning method in a wireless communication network which can automatically execute the network provisioning procedure and thus save valuable time and effort for users.

SUMMARY OF THE INVENTION

The method for auto provisioning for a communication device according to one embodiment of the present invention comprises the steps of: receiving a request from a station; determining the validity of the request according to a verification code carried by the request; sending a response to the station; receiving a security message from the station; retrieving a security key carried by the security message; and executing network provisioning according to the security key.

The method for auto provisioning for a station according to another embodiment of the present invention comprises the steps of: searching for a communication device by sending a request, wherein the request carries a verification code; receiving a response from a communication device; and sending a security message to the communication device, wherein the security message carries a security key.

BRIEF DESCRIPTION OF THE DRAWINGS

The objectives and advantages of the present invention will become apparent upon reading the following description and upon referring to the accompanying drawings of which.

DETAILED DESCRIPTION OF THE INVENTION

Figure 1:
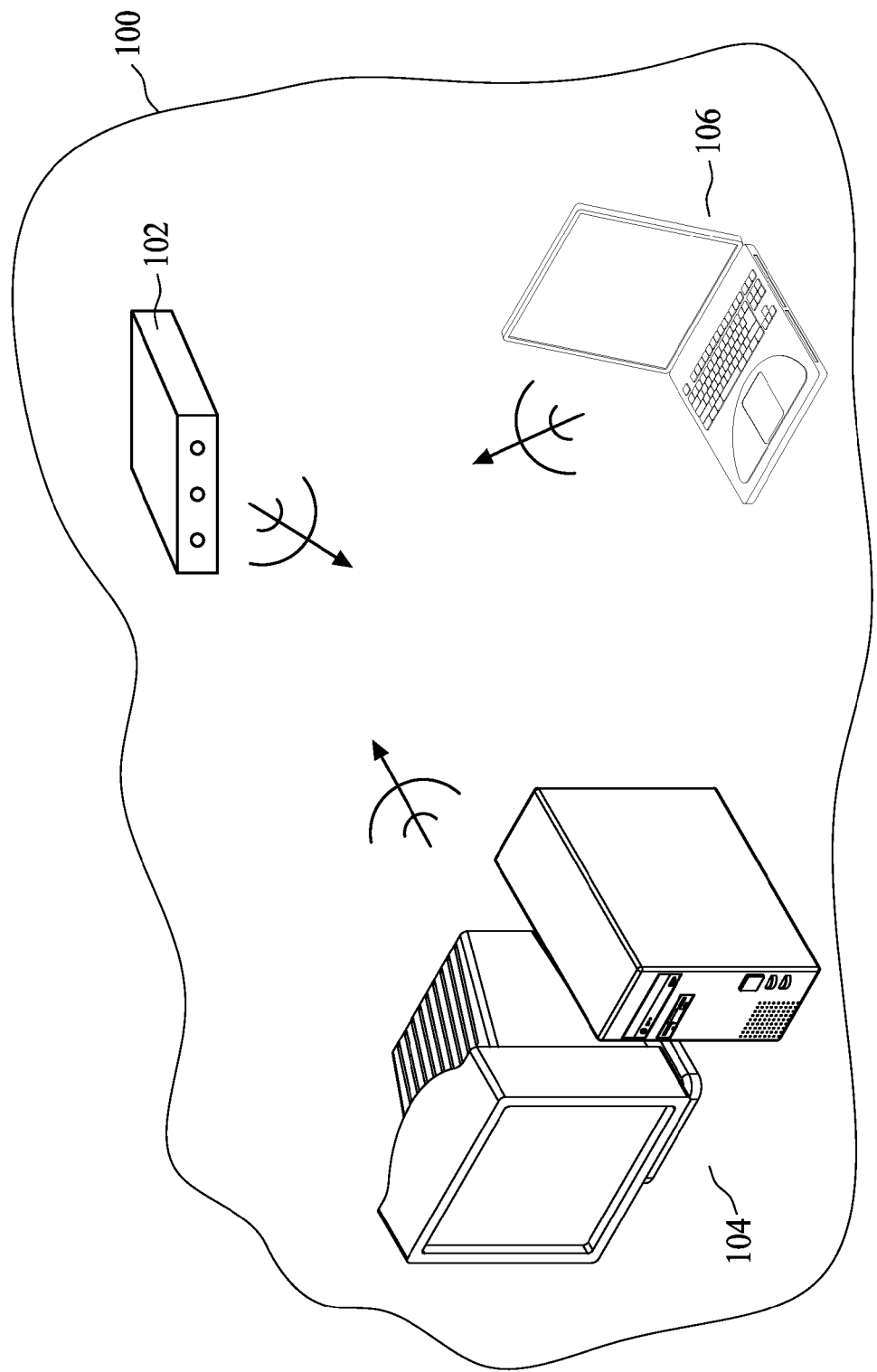
FIG. 1 shows a Wi-Fi wireless communication network according to an embodiment of the present invention.

FIG. 1 shows a Wi-Fi wireless communication network according to an embodiment of the present invention. As shown in FIG. 1, the Wi-Fi wireless communication network 100 comprises an access point 102 and, for example, two stations 104 and 106. Initially, the stations 104 and 106 are both in an infra mode, and they both search for an access point. If the access point 102 is successfully found by the stations 104 and 106, the stations 104 and 106 will send verification codes to the access point 102. The access point 102 then checks the verification codes to determine their validities. If the validities are confirmed, WPS messages are exchanged between the access point 102 and the stations 104 and 106. Among the WPS messages, security keys, such as the PIN code of the stations 104 and 106, are retrieved by the access point 102. Accordingly, the access point 102 can use this information to execute network provisioning according to the security keys.

If the access point 102 is not found by the stations 104 and 106, the stations 104 and 106 will enter an ad-hoc mode. In this mode, one of the stations 104 and 106 will serve as an independent basic service set (IBSS) creator, which performs functions similar to those performed by the access point 102, while the other one retains the character of a station. Accordingly, the stations 104 and 106 can perform the procedure similar to that of the access point 102, and the network provisioning is automatically executed.

Figure 2:
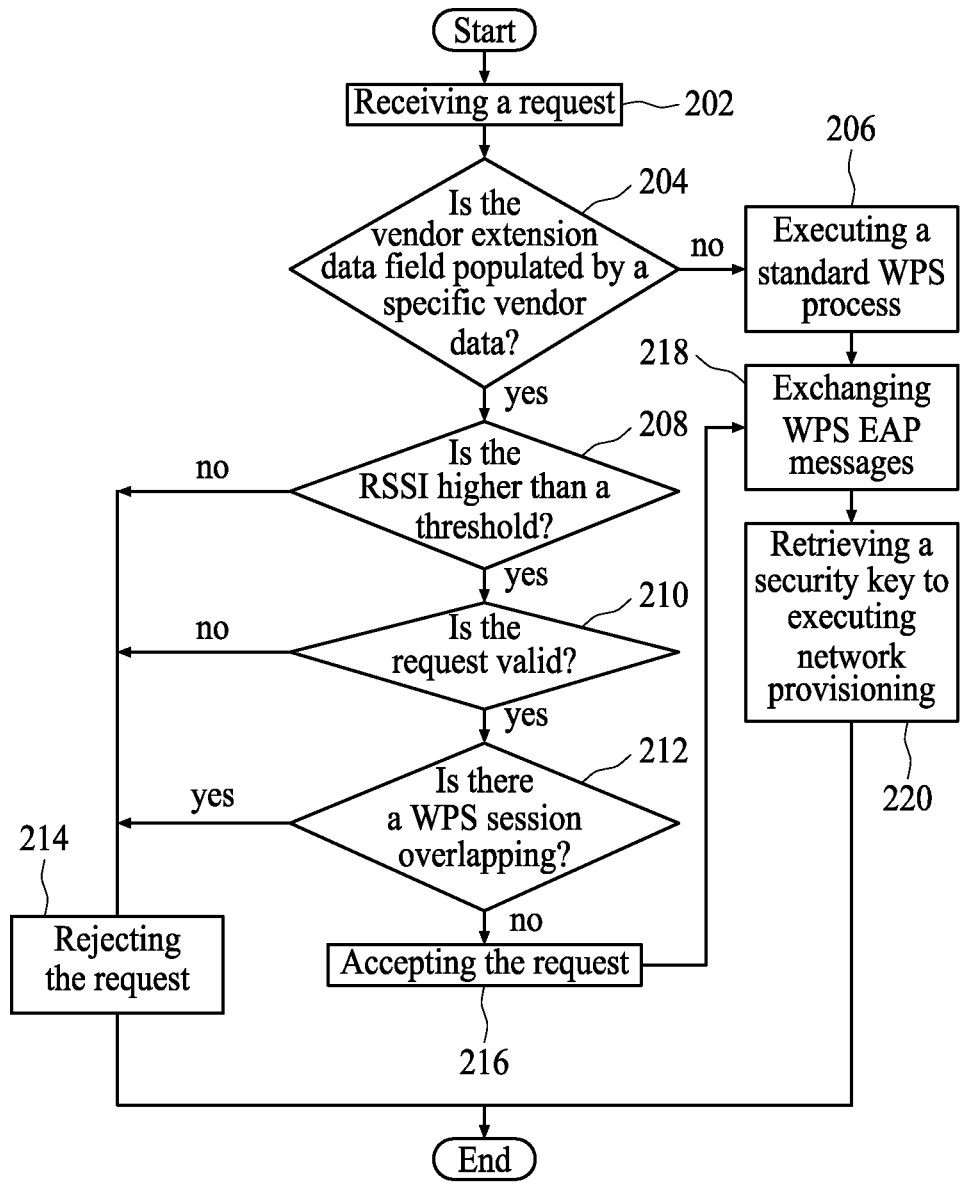
FIG. 2 shows the flow chart of a method for auto provisioning for an access point in a wireless communication system according to an embodiment of the present invention.

FIG. 2 shows the flow chart of a method for auto provisioning for an access point in a wireless communication system according to an embodiment of the present invention. In step 202, a request from a station is received, and step 204 is executed. In step 204, a vendor extension data field carried by the request is checked. If the vendor extension data field is populated by a specific vendor's data, step 208 is executed; otherwise, step 206 is executed. In step 206, a standard WPS process is executed, and step 218 is executed. In step 208, the strength of the request, indicated by a received signal strength indicator (RSSI), is checked to determine whether the request is accepted or rejected. If the RSSI is higher than a threshold, the request is accepted, and step 210 is executed; otherwise, step 214 is executed. In step 210, a security message carried by the request is checked to determine whether the request is valid. If the request is valid, step 212 is executed; otherwise, step 214 is executed. In step 212, it is determined whether there is an overlapping WPS session. If there is an overlapping WPS session, step 214 is executed; otherwise, step 216 is executed. In step 214, the request is rejected, wherein a reason data carried by the response of the access point is populated by a rejection flag. In step 216, the request is accepted, wherein a reason data carried by the response of the access point is populated by an acceptance flag, and step 218 is executed. In step 218, WPS EAP messages are exchanged between the access point and the station, and step 220 is executed. In step 220, a security key is retrieved from the WPS EAP messages, and network provisioning is executed according to the security key.

As shown in the flow chart of FIG. 2, the security key required by network provisioning, for example, the PIN code of the station, is obtained by the access point automatically. Accordingly, users are not required to type in this information manually, and hence the method shown in FIG. 2 is more user-friendly.

Figure 3:
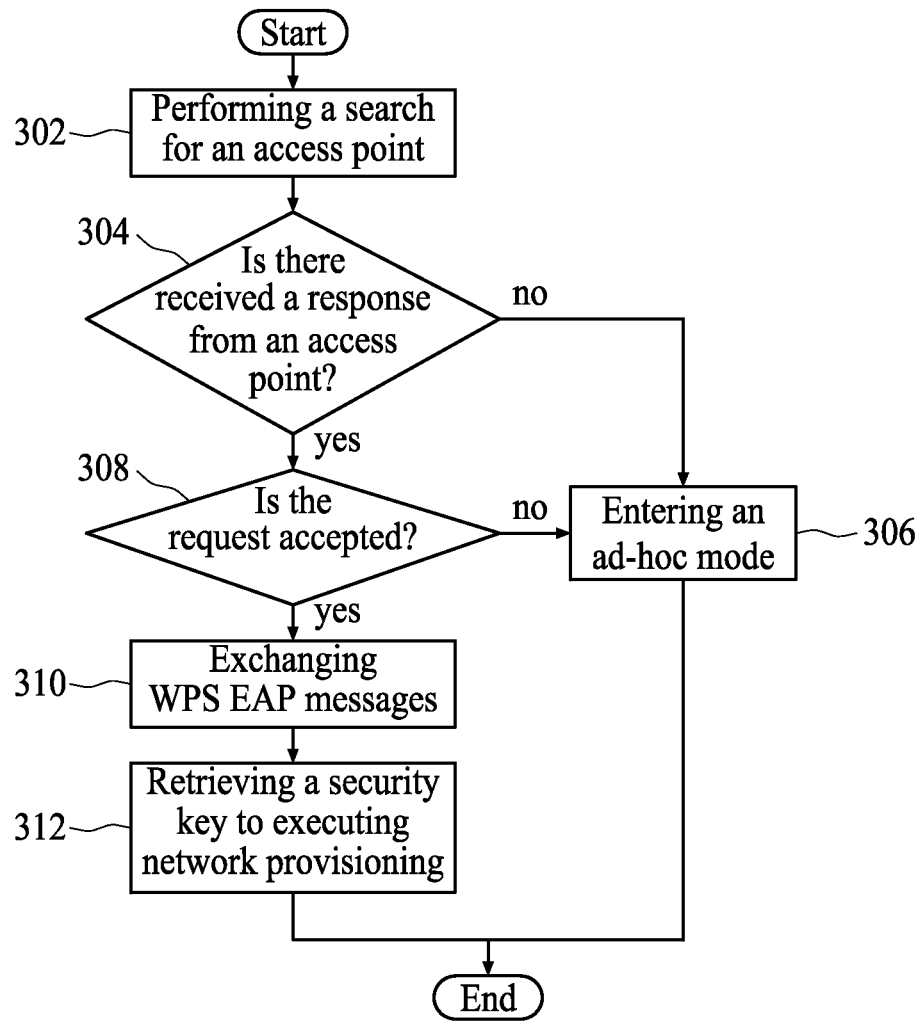
FIG. 3 shows the flow chart of a method for auto provisioning for a station in an infra mode in a wireless communication system according to an embodiment of the present invention.

FIG. 3 shows the flow chart of a method for auto provisioning for a station in an infra mode in a wireless communication system according to an embodiment of the present invention. In step 302, a search for an access point is performed by the station by sending a request, and step 304 is executed, wherein the request carries a verification code. In step 304, it is determined whether a response from an access point is received. If a response from an access point is received, step 306 is executed; otherwise, step 308 is executed. In step 306, an ad-hoc mode is entered. In step 308, it is determined whether the request is accepted. If the request is accepted, step 310 is executed; otherwise, step 306 is executed. In step 310, WPS EAP messages are exchanged between the access point and the station, and step 312 is executed. In step 312, a security key is retrieved from the WPS EAP messages, and network provisioning is executed according to the security key.

Combining the methods shown in FIGS. 2 and 3, it can seen that if the request of the station is valid, that is, if the RSSI is strong enough and the verification code is granted, the access point and the station can exchange the WPS EAP messages. Accordingly, the required security key can be carried in the WPS EAP messages, and the network provisioning can be carried out automatically.

Figure 4A:
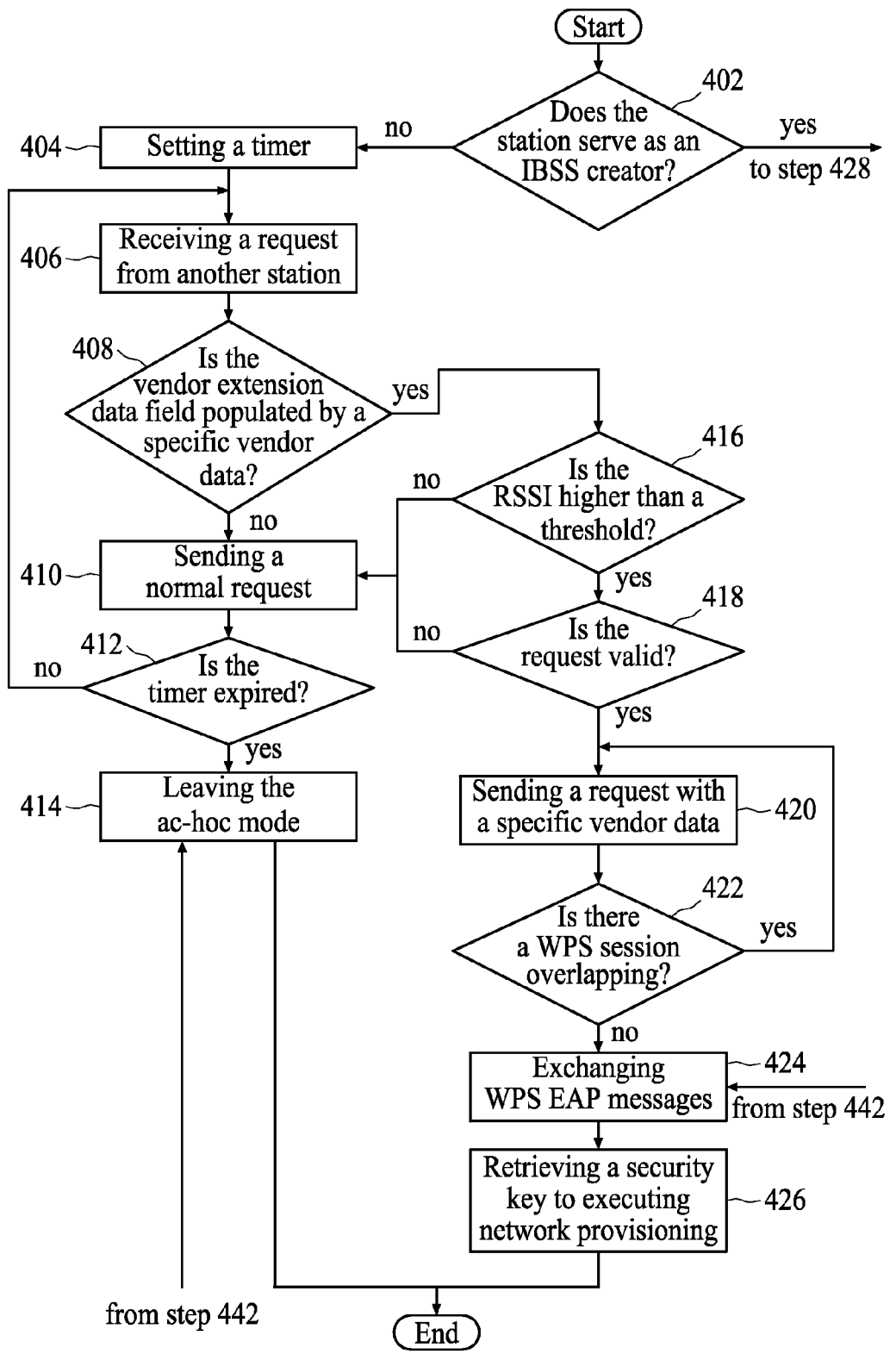
FIGS. 4A and 4B show the flow chart of a method for auto provisioning for a station in an ad-hoc mode in a wireless communication system according to an embodiment of the present invention.
Figure 4B:
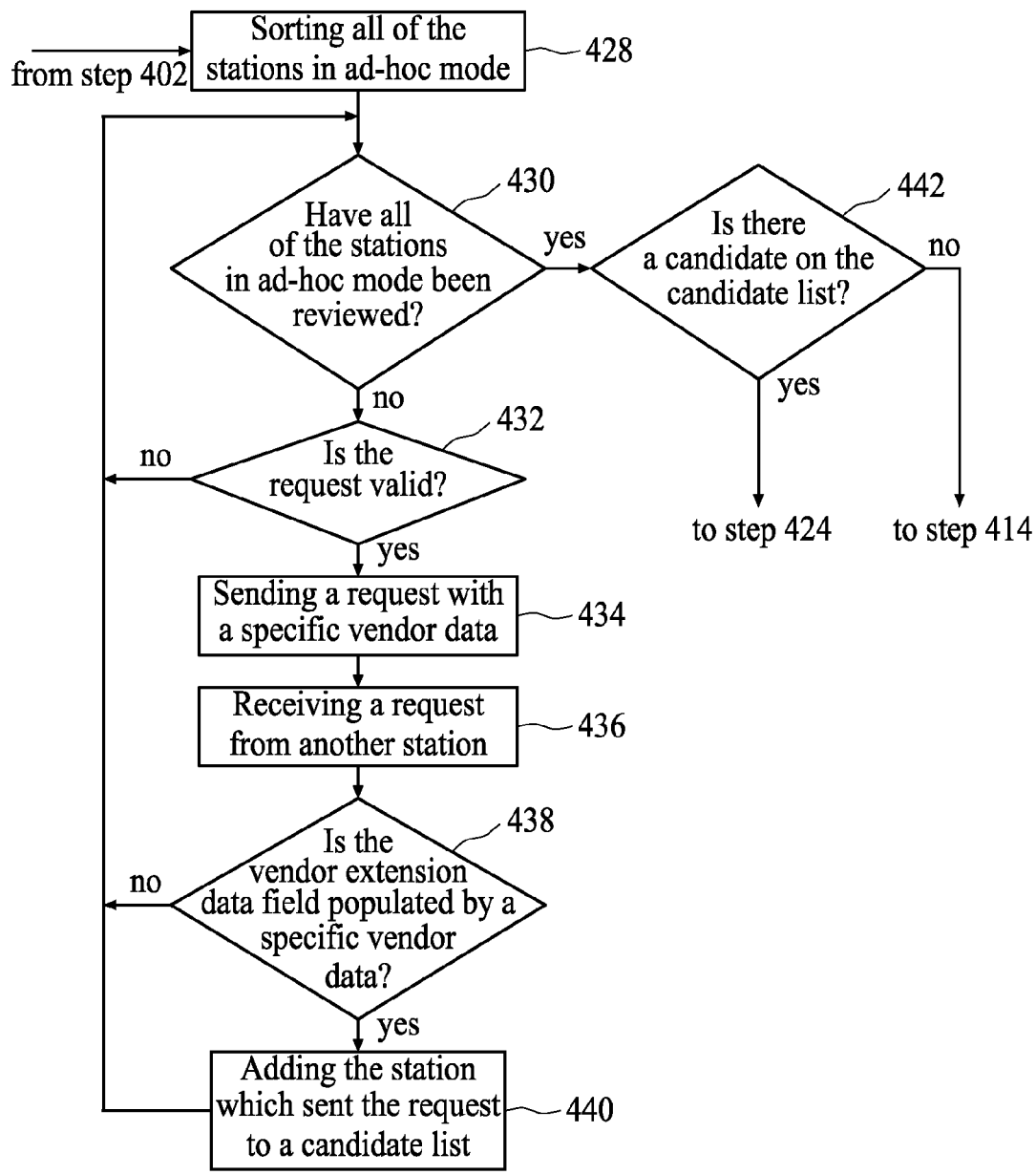

As shown in FIG. 3, if there is no access point found, or the request is rejected, the station will enter an ad-hoc mode. FIGS. 4A and 4B show the flow chart of a method for auto provisioning for a station in an ad-hoc mode in a wireless communication system according to an embodiment of the present invention. In step 402, whether the station is an IBSS creator is checked. If the station serves as an IBSS creator, step 428 is executed; otherwise, step 404 is executed. In step 404, a timer is set, and step 406 is executed. In step 406, a request from another station in ad-hoc mode is received, and step 408 is executed. In step 408, a vendor extension data field carried by the request is checked. If the vendor extension data field is populated by a specific vendor's data, step 416 is executed; otherwise, step 410 is executed. In step 410, a normal request without specific vendor data is sent, and step 412 is executed. In step 412, the status of the timer is checked. If the timer is expired, step 414 is executed; otherwise, step 406 is executed. In step 414, the station leaves the ac-hoc mode. In step 416, the strength of the request, indicated by an RSSI, is checked to determine whether the request is accepted or rejected. If the RSSI is higher than a threshold, the request is accepted, and step 418 is executed; otherwise, step 410 is executed. In step 418, a security message carried by the request is checked to determine whether the request is valid. If the request is valid, step 420 is executed; otherwise, step 410 is executed. In step 420, a request with a specific vendor's data is sent, and step 422 is executed. In step 422, it is determined whether there is an overlapping WPS session. If there is an overlapping WPS session, step 420 is executed; otherwise, step 424 is executed. In step 424, WPS EAP messages are exchanged between the station and another station in the ad-hoc mode, and step 426 is executed. In step 426, a security key is retrieved from the WPS EAP messages, and network provisioning is executed according to the security key.

In step 428, all of the stations in ad-hoc mode are sorted according to the RSSI, and step 430 is executed. In step 430, it is determined whether all of the stations in ad-hoc mode are reviewed. If all of the stations in ad-hoc mode are reviewed, step 442 is executed; otherwise, step 432 is executed. In step 432, a security message carried by a request is checked to determine whether the request is valid. If the request is valid, step 434 is executed; otherwise, step 430 is executed. In step 434, a request with a specific vendor's data is sent, and step 436 is executed. In step 436, a request from another station in ad-hoc mode is received, and step 438 is executed. In step 438, a vendor extension data field carried by the request is checked. If the vendor extension data field is populated by a specific vendor's data, step 440 is executed; otherwise, step 430 is executed. In step 440, the station which sent the request is added to a candidate list, and step 430 is then executed. In step 442, the number of candidates on the candidate list is checked. If there is a candidate on the candidate list, step 424 is executed; otherwise, step 414 is executed.

As can be seen from the method shown in FIGS. 4A and 4B, the stations in ad-hoc mode can perform the method similar to the methods shown in FIGS. 2 and 3. Accordingly, the required security key can be carried in the WPS EAP messages, and the network provisioning can be carried out automatically.

Figure 5:
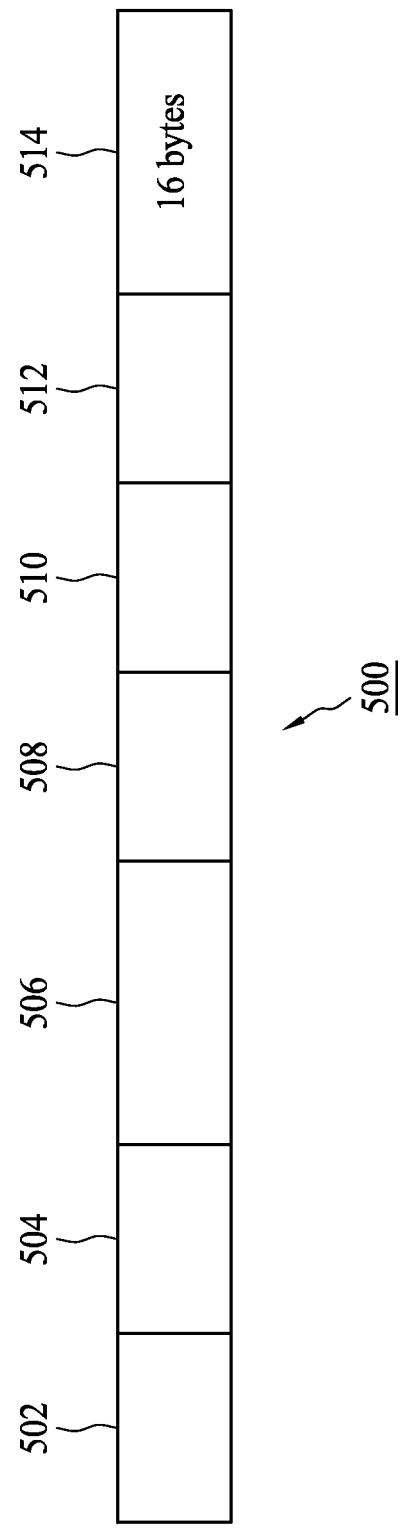
FIG. 5 shows the format of a request sent by a station according to an embodiment of the present invention.

FIG. 5 shows the format of a request sent by a station according to an embodiment of the present invention, wherein the request can be a beacon or a probe request. As shown in FIG. 5, the request 500 can be divided into several fields 502 to 514. The fields 502 and 504 form a tag part. The field 506 is a length part. The fields 508 to 514 form a value part, wherein the fields 508 to 512 are a vendor ID part, and the field 514 is a vendor data part. In some embodiments of the present invention, the field 514, i.e. the vendor data part, is populated by the verification code, which is 16 bytes by length.

Figure 6:
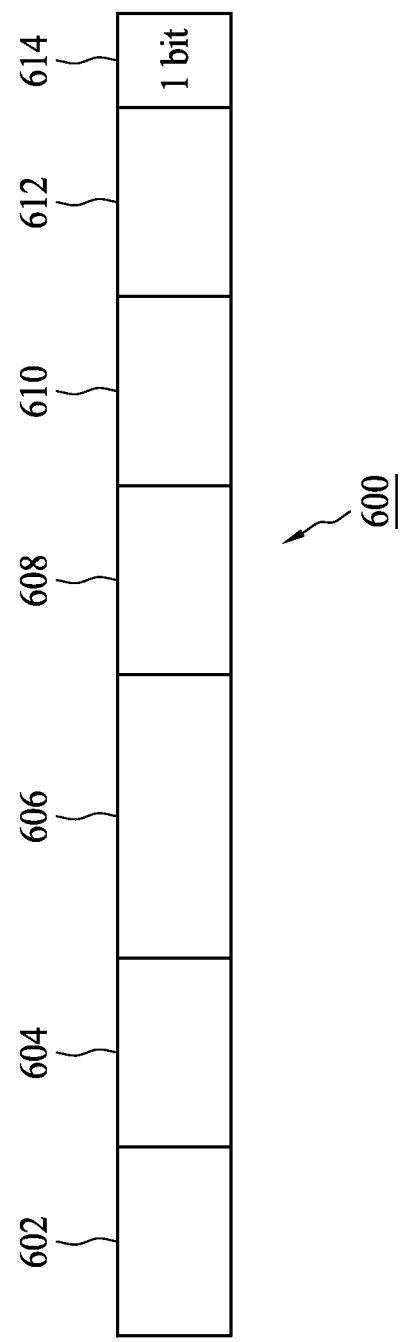
FIG. 6 shows the format of a response sent by an access point according to an embodiment of the present invention.

FIG. 6 shows the format of a response sent by an access point according to an embodiment of the present invention. As shown in FIG. 6, the response 600 can be divided into several fields 602 to 614. The fields 602 and 604 form a tag part. The field 606 is a length part. The fields 608 to 614 form a value part, wherein the fields 608 to 612 are a vendor ID part, and the field 614 is a vendor data part. In some embodiments of the present invention, the field 614, i.e. the vendor data part, is populated by reason data, which is 1 bit by length, representing the acceptance or the rejection of a request sent by a station.

Figure 7:
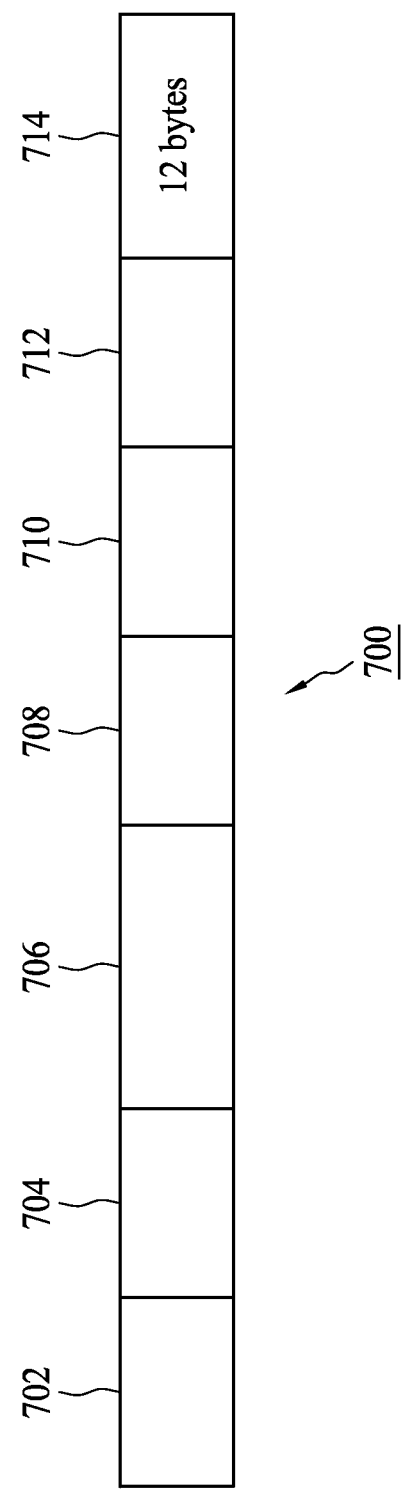
FIG. 7 shows the format of a WPS extensible authentication protocol (EAP) message sent by a station according to an embodiment of the present invention.

FIG. 7 shows the format of a WPS EAP message sent by a station according to an embodiment of the present invention. As shown in FIG. 7, the WPS EAP message 700 can be divided into several fields 702 to 714. The fields 702 and 704 form a tag part. The field 706 is a length part. The fields 708 to 714 form a value part, wherein the fields 708 to 712 are a vendor ID part, and the field 714 is a vendor data part. In some embodiments of the present invention, the field 714, i.e. the vendor data part, is populated by the encrypted PIN code of the station, which is 12 bytes by length.

In conclusion, the auto provisioning method provided by the embodiments of the present invention performs a security message exchange procedure to send a security key. Accordingly, the network provisioning can be executed according to the security key automatically.

The above-described embodiments of the present invention are intended to be illustrative only. Those skilled in the art may devise numerous alternative embodiments without departing from the scope of the following claims.

What is claimed is:

1. A method for auto provisioning for a communication device, comprising the steps of:
   receiving a request from a station;
   determining the validity of the request according to a verification code carried by the request;
   sending a response to the station;
   receiving a security message from the station;
   retrieving a security key carried by the security message; and
   executing network provisioning according to the security key,
   wherein the security message is a Wi-Fi protected setup (WPS) extensible authentication protocol (EAP) message, and the security key is an encrypted PIN code of the station for avoiding PIN code manual inputting.

2. The method of claim 1, further comprising a step of:
   determining whether to accept the request according to the signal strength of the request.

3. The method of claim 1, wherein the signal strength of the request is indicated by a received signal strength indicator (RSSI).

4. The method of claim 1, wherein the verification code is included in a vendor data part of the request.

5. The method of claim 1, wherein a reason data of acceptance and rejection is carried by the response.

6. The method of claim 4, wherein the reason data, which is 1 bit by length, is included in a vendor data part of the response.

7. The method of claim 1, wherein the security key is included in a vendor data part of the security message.

8. The method of claim 1, wherein the communication device is an access point.

9. The method of claim 1, wherein the communication device is a station serving as an independent basic service set (IBSS) creator in an ad-hoc mode.

10. The method of claim 9, further comprising the steps of:
    setting up a timer; and
    leaving the ad-hoc mode if the timer is expired.

11. The method of claim 1, wherein the communication device is a station in an ad-hoc mode.

12. The method of claim 11, further comprising the steps of:
    leaving the ad-hoc mode if no other station in ad hoc mode is found.

13. A method for auto provisioning for a station, comprising the steps of:
    searching for a communication device by sending a request, wherein the request carries a verification code;
    receiving a response from a communication device; and
    sending a security message to the communication device, wherein the security message carries a security key,
    wherein the security message is a Wi-Fi protected setup (WPS) extensible authentication protocol (EAP) message, and the security key is an encrypted PIN code of the station for avoiding PIN code manual inputting.

14. The method of claim 13, wherein the communication device is an access point.

15. The method of claim 14, further comprising a step of:
    entering an ad-hoc mode if no access point is found.

16. The method of claim 13, wherein the station is in an ad-hoc mode, and the communication device is another station in an ad-hoc mode.

17. The method of claim 16, further comprising a step of:
    leaving the ad-hoc mode if no other station in ad hoc mode is found.

18. The method of claim 13, wherein the verification code, which is 16 bytes by length, is included in a vendor data part of the request.

19. The method of claim 13, wherein a reason data of acceptance and rejection is carried by the response.

20. The method of claim 19, wherein the reason data is included in a vendor data part of the response.

21. The method of claim 13, wherein the security key is included in a vendor data part of the security message.

* * * * *